United States Patent [19]

Honda et al.

[11] Patent Number: 4,544,525
[45] Date of Patent: Oct. 1, 1985

[54] SOLID GAS CONTACT REACTOR

[75] Inventors: Mitsuyasu Honda; Masao Hino; Toru Seto, all of Hiroshima, Japan

[73] Assignee: Mitsubishi Jukogyo Kabushiki Kaisha, Tokyo, Japan

[21] Appl. No.: 458,015

[22] Filed: Jan. 14, 1983

Related U.S. Application Data

[63] Continuation of Ser. No. 263,568, May 14, 1981, abandoned.

[30] Foreign Application Priority Data

May 19, 1980 [JP] Japan .............................. 55-67571[U]

[51] Int. Cl.$^4$ ............................................. B01D 50/00
[52] U.S. Cl. ...................................... 422/171; 55/515; 60/299; 422/176; 422/180; 422/217; 422/220; 422/222; 422/311
[58] Field of Search ............... 422/171, 176, 180, 217, 422/220, 222, 311; 55/418, 515; 110/203, 216; 432/72; 60/299

[56] References Cited

U.S. PATENT DOCUMENTS 4,322,386 3/1982 Masutomi et al. .................. 422/176

FOREIGN PATENT DOCUMENTS 0099772 8/1979 Japan .................................. 422/171

Primary Examiner—Barry S. Richman
Assistant Examiner—William K. Johnson
Attorney, Agent, or Firm—Toren, McGeady, Stanger, Goldberg & Kiel

[57] ABSTRACT

A solid-gas contact reactor for dirty exhaust gas is characterized by a first dust-proof plate provided on contact areas between a lower surface of a support base for supporting packages of catalyst layers in each stage and a reactor wall so that the first dust-proof plate makes an angle equal to or larger than the rest angle of dust in the exhaust gas with respect to the support base. Second dust-proof plates are provided on contact areas between adjacent ones of the packages of catalyst layers in each stage and contact areas between the reactor wall and frames of the packages of catalyst layers and the second dust-proof plates make the same angle with respect to the frame structure.

3 Claims, 9 Drawing Figures

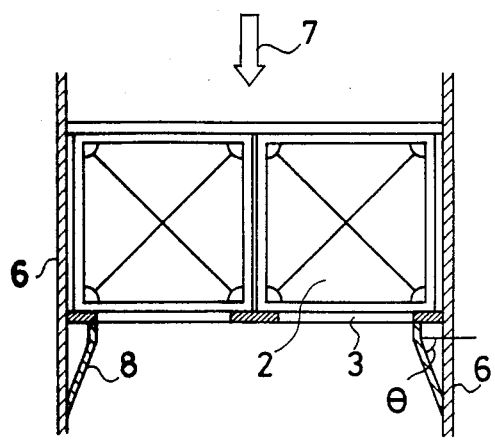
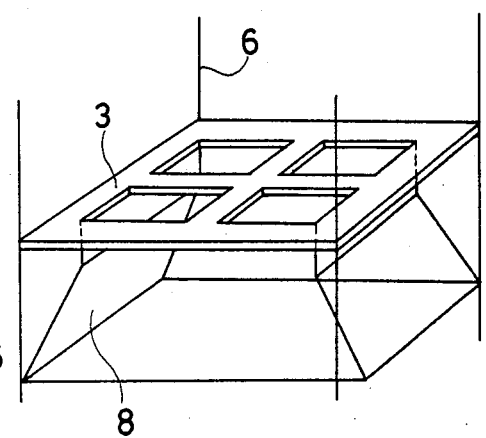
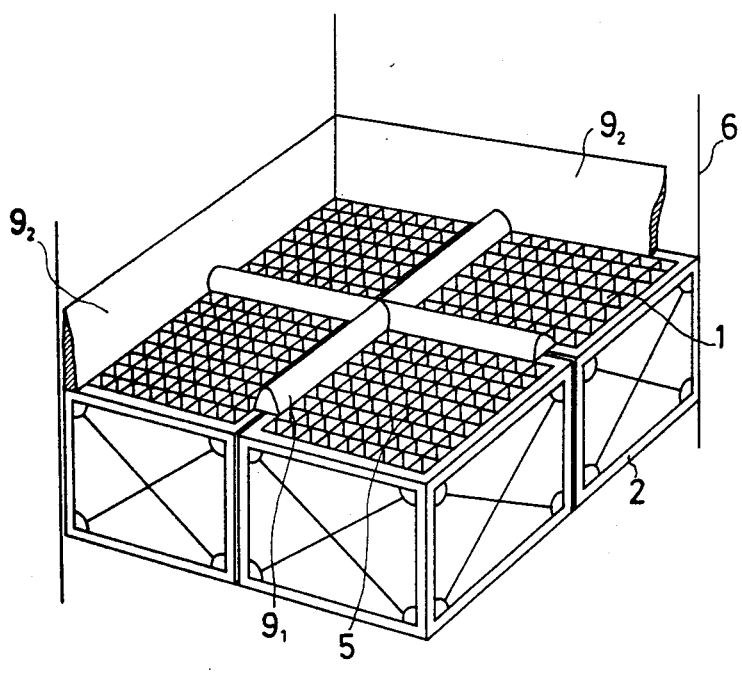
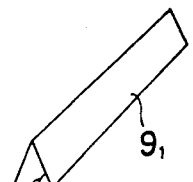
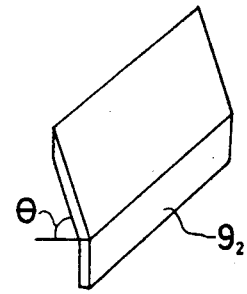

SOLID GAS CONTACT REACTOR

This is a continuation of application Ser. No. 263,568 filed May 14, 1981, now abandoned.

BACKGROUND OF THE INVENTION

The present invention relates to an improvement on a solid-gas contact reactor for dirty gas such as exhaust gas of a sintering furnace or a coking oven using coal or heavy oil and, more particularly, to such reactor of upright type in which the troubles due to a piling up of dust are eliminated.

The conventional solid-gas contact reactor is shown in FIGS. 1A to 1D. As will be clear from these figures, it is composed of a plurality of packages of catalyst layers each composed of a plurality of relatively short, identical honeycomb catalysts 1 stacked in a frame structure 2. The plurality of the packages of catalyst layers are mounted on a support base 3 provided for each stage of the reactor. Although the cross sectional shape of each gas passage of the honeycomb catalyst is shown as being reactangular in FIG. 1A, it may be hexagonal or triangular.

With this structure, a gas flow 7 in the down stream side of the support base 3 tends to drift. In addition to this, since the flow rate of the gas is relatively low, there may be vortices in a peripheral area of a lower surface of the support base 3 adjacent to a wall 6 of the reactor and dust 4 may pile up around the peripheral area with time, as shown in FIG. 1D. This tendency is enhanced when the dust is viscous.

When the accumulation of the dust 4 exceeds a certain level, it tends to fall down into the gas passages 5 and the end faces of the catalyst layers in the subsequent stage by gravity or other externally applied vibrations etc., resulting in a substantial pressure loss in the reactor and renders impossible a continuous, long period of operation and further, the performance of the catalyst itself is degraded.

Further, dust accumulates on areas a between the adjacent frame structures 2 and areas b between the frame structure 2 and the reactor wall 6 on the upstream side of the gas flow. The dust ends to fall downwardly due to external forces etc. and clog the gas passages 5 of the catalyst layers thereof, causing the same problems to occur as mentioned previously concerning the down stream side.

SUMMARY OF THE INVENTION

The present invention is intended to resolve the above-mentioned problems inherent in the conventional reactor and an object of the present invention is to provide an improvement on the conventional solid-gas contact reactor for dirty exhaust gas, which is featured by a first dust-proof plate means provided on contact areas between a lower surface of a support base for support packages of catalyst layers in each stage and a reactor wall so that the first dust-proof plate means makes an angle equal to or larger than the rest angle of dust in the exhaust gas with respect to the support base and second dust-proof plate means provided on contact areas between adjacent ones of the packages of catalyst layers in each stage and contact areas between the reactor wall and frames of the packages of catalyst layers so that the second dust-proof plate means forms the same angle with respect to the frame structure of the reactor.

BRIEF DESCRIPTION OF THE DRAWING

Other objects and features of the present invention will become clear from the following description of the preferred embodiments of the present invention with reference to the accompanying drawings through which identical portions are depicted by the same reference numerals, in which:

FIGS. 1A to 1D show the conventional solid-gas contact reactor in which FIG. 1A is a unit of honeycomb layers, FIG. 1B is a packages of catalyst layers, FIG. 1C is a plurality of packages of catalyst layers mounted in stack on the support bases of the reactor frame and FIG. 1D illustrates the dust accumulation in the reactor.

FIGS. 2A to 2C show an embodiment of the present invention in which FIG. 2A illustrates the downstream side portion of the embodiment, FIG. 2B is a perspective view of FIG. 2A and FIG. 2C illustrates the upstream side portion of the embodiment; and FIGS. 3A and 3B show dust-proof plate means adapted to be used in the upstream side.

DETAILED DESCRIPTION OF THE PREFERRED EMBODIMENT

Firstly, to the downstream side of the packages of catalyst layers on the support base 3 with respect to the gas flow 7, a first dust-proof plate means is provided on the wall 6. The support base has openings therethrough aligned with the edges of the frame structure defining the flow path through each package of catalyst layers. The openings have sides arranged generally parallel to and spaced closely from the inside surface of the wall forming the flow path through the reactor. The first dust-proof plate means comprises a plate member 8 bridging between the wall 6 and the lower surface of the support base 3 as shown in FIGS. 2A and 2B. The angle $\theta$ between the plate member 8 and the support base 3 is selected such that it is not less than the rest angle (45°) of dust in the exhaust gas and is less than 90°. It may be possible that the plate member 8 is formed integrally with the support base 3. It is preferable that the plate member 8 has flat and smooth surfaces.

Figure 1A:
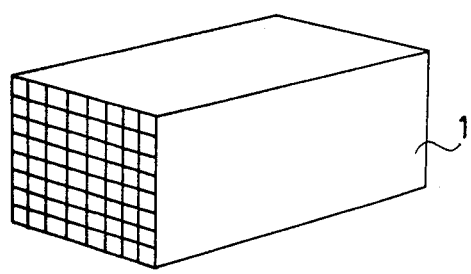
Figure 1B:
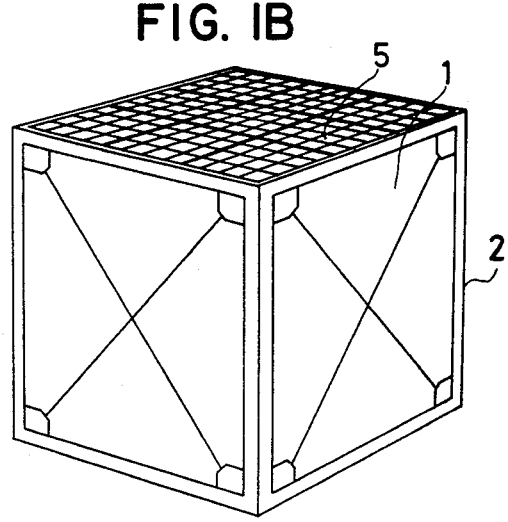
Figure 1D:
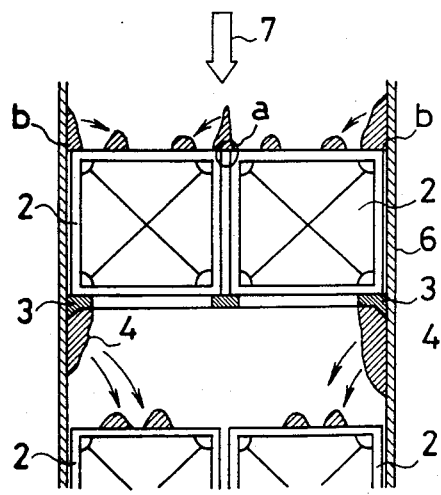
Figure 1C:
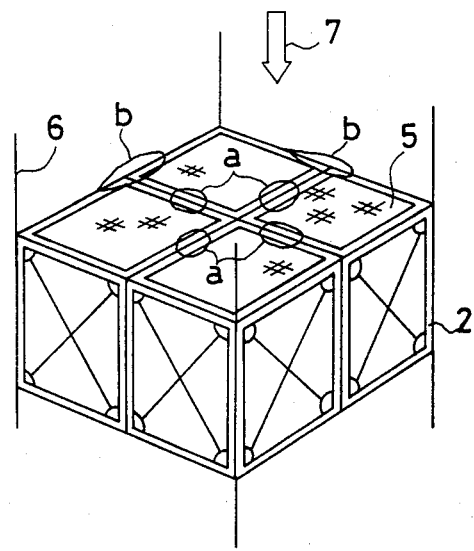

In the upstream side of the packages of catalyst layers, second dust-proof plate means 9 is provided as shown in FIG. 2C. The second dust-proof plate means 9 comprises a dust-proof plate member $9_1$ for contact areas a, note FIG. 1C, between the adjacent packages of catalyst layers and a dust-proof plate member $9_2$ for the contact areas b between the packages of catalyst layers and the reactor wall 6. The plate members $9_1$ and $9_2$ have the structures shown in FIGS. 3A and 3B, respectively. That is the slanting angle $\theta$ thereof is generally selected as being equal to or larger than the rest angle (45°) but smaller than 90°.

With the above-mentioned structure, the accumulation of dust on the downstream side of the support base and on the upper portion of the frame structure facing toward the inlet side of the catalyst layers is minimized. Therefore, clogging of the gas passages thereof and the adverse effects on the catalyst performance are eliminated, affording a long period, continuous operation of the reactor to become possible. This effect is very important practically.

Although in the above mentioned embodiment, the gas flows vertically downwardly, the present invention is also applicable to gas flow in the opposite direction.

What is claimed is:

1. In a solid-gas reactor for dirty exhaust gases generated by combustion of coal or heavy oil, comprising a plurality of walls forming an upright reactor and defining a flow path for exhaust gas therethrough in the downward direction with said reactor laterally defining the transverse area of said flow path, at least one stage of catalyst packages located within and extending across said flow path through the upright reactor, a support base extending across said reactor for supporting said packages, said at least one stage of catalyst packages comprising a plurality of individual packages of catalysts supported on and extending upwardly from said support base, each of said individual packages comprising a plurality of honeycomb catalysts and an upwardly extending frame structure laterally enclosing said plurality of honeycomb catalysts, wherein the combination of said individual packages of catalysts and said frame structure fill the transverse area of said flow path, with said frame structure for said packages comprising at least one first side which is adjacent to the first sides of other frame structures and thereby defining a joint between adjacent frame structures and at least one second side which is directly adjacent to and extends along a portion of said walls, wherein the improvement comprises said support base extending across the full transverse area of the flow path within said reactor, a first dust-proof plate means extending downwardly from said support base at a position spaced inwardly from said walls into contact with said walls at a location spaced below said support base, wherein said first dust-proof plate means comprises a first part extending vertically downwardly from said support base and a second part extending from the lower end of said first part outwardly to said wall with said second part disposed at an angle with respect to said support base which is not less than the rest angle of the dust in the exhaust gas, a second dust-dproof plate means located on the upper sides of said frame structures, said second dust-proof plate means comprising a plurality of first panels forming an inverted V-shaped structure extending upwardly from said frame structure at a position bridging the joint between adjacent frame structures, and second panels comprising a first part extending vertically upwardly from a position adjacent said second side of said frame structure and a second part extending upwardly from the upper end of said first part outwardly to said walls with said second part disposed at an angle with respect to said walls which is approximately the same angle as said angle of said first dust-proof means with respect to said support base.

2. In a solid-gas contact reactor, as set forth in claim 1, wherein said angle is in the range of at least 45° and less than 90°.

3. In a solid-gas contact reactor, as set forth in claim 1, wherein said walls form a rectangularly shaped transverse flow path in said reactor, said support base is rectangularly shaped and has openings therethrough for permitting the exhaust gas to flow without interference through said packages of catalysts, said openings are rectangularly shaped and have a pair of first sides which are located directly adjacent to said walls and a pair of second sides, said first dust-proof plate means extending downwardly from the first sides of said openings within said support base.

* * * * *